(No Model.)

R. O. WOOD.
AUTOMATIC BRAKE FOR VEHICLES.

No. 438,669. Patented Oct. 21, 1890.

Witnesses:
Walter S. Bowen
Julia B. Wood

Inventor:
Rosco O. Wood M.D.

UNITED STATES PATENT OFFICE.

ROSTO O. WOOD, OF WORCESTER, MASSACHUSETTS.

AUTOMATIC BRAKE FOR VEHICLES.

SPECIFICATION forming part of Letters Patent No. 438,669, dated October 21, 1890.

Application filed May 26, 1890. Serial No. 353,178. (No model.)

*To all whom it may concern:*

Be it known that I, ROSTO O. WOOD, a citizen of the United States, and a resident of Worcester, county of Worcester, and State of Massachusetts, have invented a new and useful Improvement in an Automatic Brake Mechanism for Vehicles, of which the following is a specification, accompanied by drawings forming a part of the same, and together containing a full, clear, and exact description of my invention.

Figure 1:
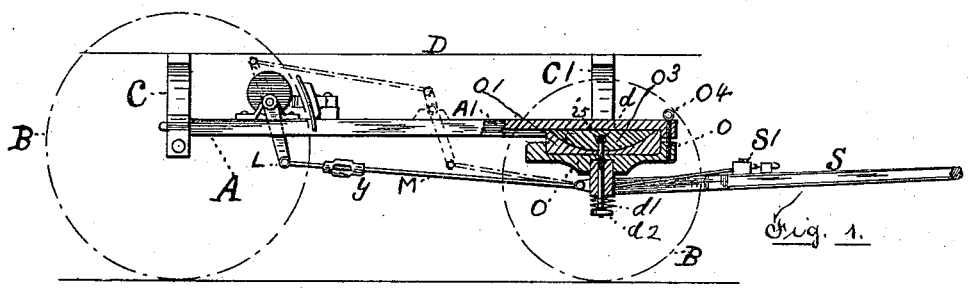
Figure 2:
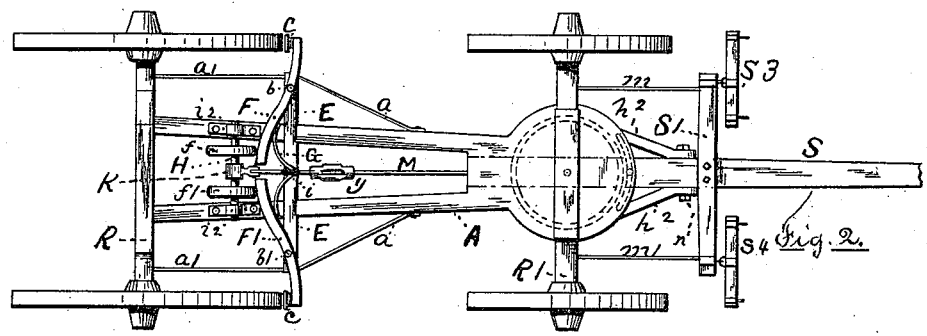
Figures 3, 5, 7:
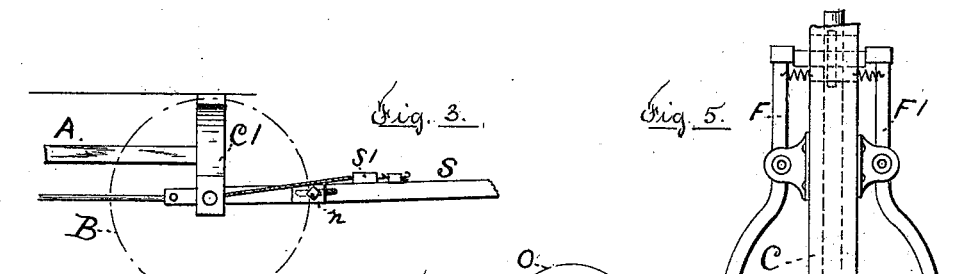
Figures 4, 6, 8, 9:
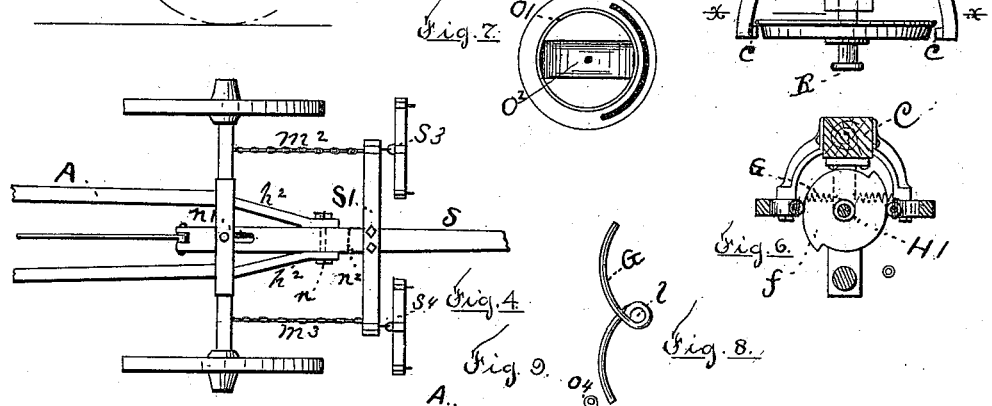

By reference to the drawings, Figure 1 is a sectional longitudinal view of my invention and one mode of its operation. Fig. 2 is a top plan view of the same and exhibiting a practical combination of the cams with the brake-levers in position for application of the brake-shoes to the periphery of the wheels. Figs. 3, 4, and 9 are sectional views of a slight modification of my brake mechanism, but practically embodying the same principle of operation. Fig. 5 is a sectional top plan view of my invention slightly modified for its adaptability, more particularly to a car-wheel, showing the application of a cam principle operating brake-shoes on both sides of a wheel simultaneously. Fig. 6 is a sectional end view of Fig. 5 on line $x\,x$, showing the relative position of the double cam within a recess in the cross-beam to the axle of the vehicle, also showing the spring mechanism by which the brakes are automatically removed. Fig. 7 shows a part of the fifth-wheel combination or operative mechanism used on carriages where thills are employed. Fig. 8 is an enlarged view of the spring shown in these drawings in Fig. 2.

Similar letters refer to similar parts in the different figures.

My invention relates to a mechanism by which the brake-shoes can be applied to the wheels of a wagon or other vehicle by the reversal of the propelling-power as it is applied to a vehicle; and it consists in the arrangement and construction of the several parts as illustrated in the drawings and hereinafter described, and specifically pointed out in the subjoined claims.

In the accompanying drawings the mechanism forming the subject of my invention is represented as being applied to the wheels of a wagon, and the modification and changes in order to adapt it to other vehicles will be readily seen and understood without a detailed illustration and description.

A represents a section of the connecting-piece between the front and rear axle of a vehicle, commonly called the "reach," and B the outline of a wheel.

C and C' are cross-beams, on which rests the body of the wagon, indicated by line D.

E is a cross-bar, which is rigidly attached to the reach, and which is still more securely held in position by means of iron rods or braces $a\,a'$. To said cross-bar E the brake-levers F F' are pivoted at $b\,b'$, and to one end of which are attached the brake-shoes $c\,c$, while the other ends rest against a cam or eccentric $f f'$, being held in that position by the tensive pressure of spring G, which spring is held in position by means of a bolt $i$ passing down through loop $l$ and cross-bar E and secured by a nut. (See Fig. 2.)

H is a shaft journaled to bearings in brackets $i^2\,i^2$, which are rigidly attached to the reach. To said shaft H cams $f f'$ are attached in suitable position to effect the purpose for which they are designed, and in what manner will be more fully explained farther on. To shaft H is also attached centrally a radial arm K at one end, and the other end is provided with a stud or socket L, to which is pivoted one end of connecting-rod M, while the other end of said rod M is pivoted to a bracket on the posterior surface of the front axle or rear end of the pole S.

In Fig. 7 I have shown a device specially adapted for operating my brake mechanism on vehicles provided with thills, and in this I get the rearward motion of the propelling-power as follows: I provide a cup-shaped flange O, made shallow to receive a ring-plate O', within which and occupying about one-third of its upper surface centrally is a concave depression $O^2$, adapted to receive sliding bar $O^3$, made convex on its lower surface and provided at or near its upper edge with a groove or depression adapted to slide in a corresponding groove in ways provided for its reception on the under surface of the reach. (See Fig. 1 at A'.) For purposes of operating my brake mechanism I could dispense with this fifth-wheel combination, including the king-bolt and its attachments, and in lieu thereof use a bar similar in shape near its upper surface to sliding bar $O^3$, as shown in Fig. 9, pivoted to brackets attached to upper surface of axle, as shown in Fig. 9, or posterior upper surface of the pole, which would slide in corresponding grooves on the under side of the reach and produce a like result; but for purposes of relief of strain on the king-bolt going over water-bars or cross-ruts in the road this fifth-wheel device is admirably adapted; but I make no special claim for it for purposes of this application other than such parts of it as pertain to the successful operation of my brake mechanism, but for which I shall ask protection in a future application. To said sliding bar $O^3$ is pivoted one end of the king-bolt $d$, at $i^5$, while the other end passes downward through the ring-plate $O'$, shallow cup-shaped flange $O$, and the front axle $R'$, and there receives a spiral spring $d'$ and nut $d^2$, which holds the several parts in position while the sliding bar $O^3$ is forced rearward, operating the brake mechanism.

$O^4$ is a check-pin adapted to fit holes provided for its reception in the front end of the reach and a corresponding one in the shallow cup-shaped flange $O$, which is rigidly attached to the front axle, and this will be found in position, as shown in Fig. 1, when it is desirable to prevent the brake-shoes being applied. It will be observed, also, that the depression made in the cup-shaped flange $O$ is circular in form, (see Fig. 7,) which will allow the front wheels of the wagon to be turned either way when the check-pin $O^4$ is in position, as shown in Fig. 1.

S represents the pole or thills of a wagon, both being attached to the front axle and representing the draft force of the vehicle. (Shown in Figs. 1, 2, 3, and 4.) To draw-bar $S'$, which is rigidly fastened to the pole or thills, are attached singletrees $S^3$ $S^4$, as on wagons of ordinary construction. The pole S and draw-bar $S'$ (see Fig. 2) may be held more firmly in position by means of rods $m$ and $m'$. So, also, may it be still better braced by means of the hounds $h^2$, which at one end are firmly attached to the front axle, while the other ends are fastened on either side of the pole by means of bolt $n$ passing through them and the tongue, as shown in Figs. 1, 2, and 4.

In a modified form of operating the brake mechanism, as shown in Figs. 3 and 4, the pole S is slotted at $n'$ and $n^2$, through which the king-bolt $d$ and bolt $m$ pass, and which are allowed to work freely within said slots for a limited space rearward, and they perform another function as well, in preventing the pole being severed from its connections with the connecting-rod M as the wagon is drawn forward. The pole or draw-bar may be held in position at point $n^2$ by means of an iron band passing around the front end of the hounds, between which band and the hounds the pole may be made to slide freely, (though not shown in drawings.)

In the device shown in Figs. 3 and 4 chains must be used for connections between the axle and ends of draw-bar $S'$, (see letters $m^2$ and $m^3$ in these figures,) for the purpose of allowing the rearward motion of pole S in slots $n'$ and $n^2$.

In Figs. 5 and 6 I have shown how a horizontal shaft $H'$ may be placed in a recess within the cross-beam C, with cams operating brake-levers applying brake-shoes to both sides of the wheel simultaneously, the connecting-rod M passing farther backward under or over the rear axle and there pivoted to a radial arm of suitable shape and length to operate shaft $H'$ for the purpose for which it is designed. The cams may be operated by a slight modification in the construction of the parts, as indicated by dotted lines shown in Fig. 1, and the same result accomplished without materially departing from the spirit of my invention. The spring G automatically removes the brake-shoes from the wheels when the propelling-power is not reversed for the purpose of applying the brakes, and it may be of or in any convenient form or position to effect the purpose for which it is designed.

The turn-buckle or adjusting-screw, as shown on the connecting-rod M at $y$, is for the purpose of adjusting the space between the brake-shoes and the wheel. (See Figs. 1 and 2.)

The operation of this brake mechanism is as follows: As the pole or draw-bar is forced rearward by the reversal of the power by which the vehicle is drawn, as would occur upon the descent of a hill, or by stopping the horses, in order to arrest the motion of the vehicle, the shaft H is rocked by means of the connecting-rod M being connected with the reverse propelling force on the pole or draw-bar of the vehicle, and the connected radial arm on shaft H rocking the cams $f f'$ and forcing them against the ends of the brake-levers F $F'$, which turn on their pivots at $b$ $b'$ and force the brake-shoes against the periphery of the wheel. When the wagon is not descending a hill and the horses are traveling on the road where it requires forward force to propel the wagon, the various parts will be in position as shown in the drawings, the spring G automatically forcing the brake-shoes from the rim of the wheel.

Any parts of this invention described, illustrated, and claimed in a former application—to wit, Serial No. 337,238, and which is now pending—are hereby declared to be abandoned and for purposes of claiming the same in the present application.

What I do claim as my invention, and desire to secure by Letters Patent in the present application, is—

1. In a brake mechanism, the combination, with the brake-shoes and a draw-bar by which a vehicle is drawn, of a rocking shaft journaled in bearings transversely to the travel of the vehicle, said rocking shaft operatively connected with said draw-bar, substantially as described, and cams carried on said shaft, operatively connected with brake-levers with brake-shoes attached, substantially as described, causing said brake-shoes to bear forcibly against the periphery of the wheels with each reversed motion of the draw-bar by which the vehicle is drawn, substantially as described.

2. In a brake mechanism, the combination, with the draw-bar by which the vehicle is drawn, of a connecting link or rod operatively connected therewith, a rocking shaft journaled in bearings transversely to the travel of the vehicle, a radial arm attached to said rocking shaft and pivotally connected to said connecting-link, substantially as described, cams attached to said shaft, and brake-levers with brake-shoes thereto attached, arranged in position and adapted to be operated upon by said cams, whereby the brake-shoes are brought to bear forcibly against the periphery of the wheels with the reversal of the draw-bar by which the vehicle is drawn, substantially as described.

3. In a brake mechanism, the combination of a draw-bar by which the vehicle is drawn, a horizontal shaft journaled in bearings transversely to the travel of the vehicle and operatively connected with the draw-bar by which said shaft is rocked, with a reversed motion of the draw-bar by which the vehicle is drawn, substantially as described, cams carried on said shaft, and brake-levers with brake-shoes attached and pivotally connected with a cross-bar attached to the reach and in position adapted to permit said brake-shoes to be forced against the periphery of the wheel with each reversed motion of the draw-bar, substantially as described.

4. In a brake mechanism, the combination of the pole or draw-bar by which the vehicle is drawn, a horizontal shaft journaled in bearings transversely to the travel of the vehicle, cams carried on said shaft, with a radial arm thereto attached and operatively connected with the pole or draw-bar by which the vehicle is drawn, substantially as described, and brake-levers with brake-shoes attached, arranged on both sides of said shaft and pivotally connected to a cross-beam above the axle, permitting said brake-shoes to be brought in position to bear forcibly against the periphery of the wheels on both sides of the axle simultaneously with each reverse motion of the pole or draw-bar, substantially as described.

5. In a brake mechanism, the combination of the brake-lever with brake-shoes thereto attached, said brake-levers pivotally connected with a cross-bar rigidly attached to the reach connecting the two axles, a short horizontal shaft journaled in bearings rigidly attached to the wagon-reach or to a cross-beam above the axle, cams carried on said shaft, with a radial arm attached, a connecting-link pivotally connected at one end to said radial arm and the other end to the draw-bar or a bracket on the posterior surface of the front axle, and a sliding draw-bar operatively connected with said axle and the under surface of the reach and adapted to fit a groove therein, whereby said axle can be pushed rearward, carrying with it said sliding draw-bar within said groove, substantially as described, and by which means the brake-shoes are made to bear forcibly against the periphery of the wheels with each rearward motion of the draw-bar or axle, substantially as described.

6. In a brake mechanism, the combination of the draw-bar by which the vehicle is drawn, a horizontal shaft journaled in bearings transversely to the travel of the vehicle, cams carried on said shaft, with a radial arm thereto attached and operatively connected with said draw-bar, brake-levers with brake-shoes attached and placed in position to be operated upon by said cams, whereby said brake-shoes are brought to bear forcibly against the periphery of the wheels with each reversed motion of the draw-bar, substantially as described, a suitable spring mechanism whereby the brake-shoes are automatically removed when the propelling force is applied to move the vehicle forward, and a stop-pin whereby the draw-bar is prevented from moving rearward, applying the brakes when not desired, substantially as herein described and set forth.

In witness whereof I have hereunto subscribed my name in the presence of two witnesses.

ROSTO O. WOOD.

Witnesses:
EDNA I. TYLER,
ANNIE L. SMITH.